United States Patent [19]
Jäger et al.

[11] Patent Number: 6,145,817
[45] Date of Patent: Nov. 14, 2000

[54] WATER AERATING DEVICE OR DIFFUSER

[75] Inventors: Andreas Jäger, Hannover; Ferdinand Bruss, Wedemark, both of Germany

[73] Assignee: Gümmi-Jäger KG GmbH & Cie, Germany

[21] Appl. No.: 09/134,127

[22] Filed: Aug. 14, 1998

[30] Foreign Application Priority Data

Aug. 14, 1997 [DE] Germany .................. 197 35 188

[51] Int. Cl.⁷ .................................................. B01F 3/04
[52] U.S. Cl. ........................................ 261/122.2; 210/220
[58] Field of Search ................... 261/122.1, 122.2, 261/DIG. 70; 210/220

[56] References Cited

U.S. PATENT DOCUMENTS

| | | | |
|---|---|---|---|
| 4,288,394 | 9/1981 | Ewing et al. . | |
| 4,734,191 | 3/1988 | Schussler | 261/122.2 |
| 4,764,314 | 8/1988 | Schneider | 261/122.2 |
| 4,849,139 | 7/1989 | Jäger . | |
| 5,000,884 | 3/1991 | Bassfeld | 261/122.2 |
| 5,015,421 | 5/1991 | Messner | 261/122.1 |
| 5,693,265 | 12/1997 | Jäger et al. . | |
| 5,762,835 | 6/1998 | Bassfeld | 261/122.1 |
| 5,800,705 | 9/1998 | Downs | 210/220 |

FOREIGN PATENT DOCUMENTS

| | | |
|---|---|---|
| 0385198 | 9/1990 | European Pat. Off. . |
| 824376 | 12/1956 | United Kingdom . |
| 1478223 | 6/1977 | United Kingdom . |

*Primary Examiner*—C. Scott Bushey
*Attorney, Agent, or Firm*—Robert W. Becker & Associates

[57] ABSTRACT

A water aerating device is provided and includes a rigid, round, support plate that in an operating position is disposed essentially horizontally. An elastic plate rests on the support plate and is provided with a plurality of fine slits such that by at least one opening of the support plate, air can be introduced between the support plate and the elastic plate for expanding the slits. The elastic plate has an annular rim that rests against an outer surface of the support plate. A fastening ring surrounds the support plate and is axially displaceable relative thereto. A radially inwardly directed projection of the fastening ring acts upon a rim of the elastic plate such that displacement of the fastening ring in a fastening direction results in an increase of the distance of the rim from the upper surface of the support plate.

11 Claims, 1 Drawing Sheet

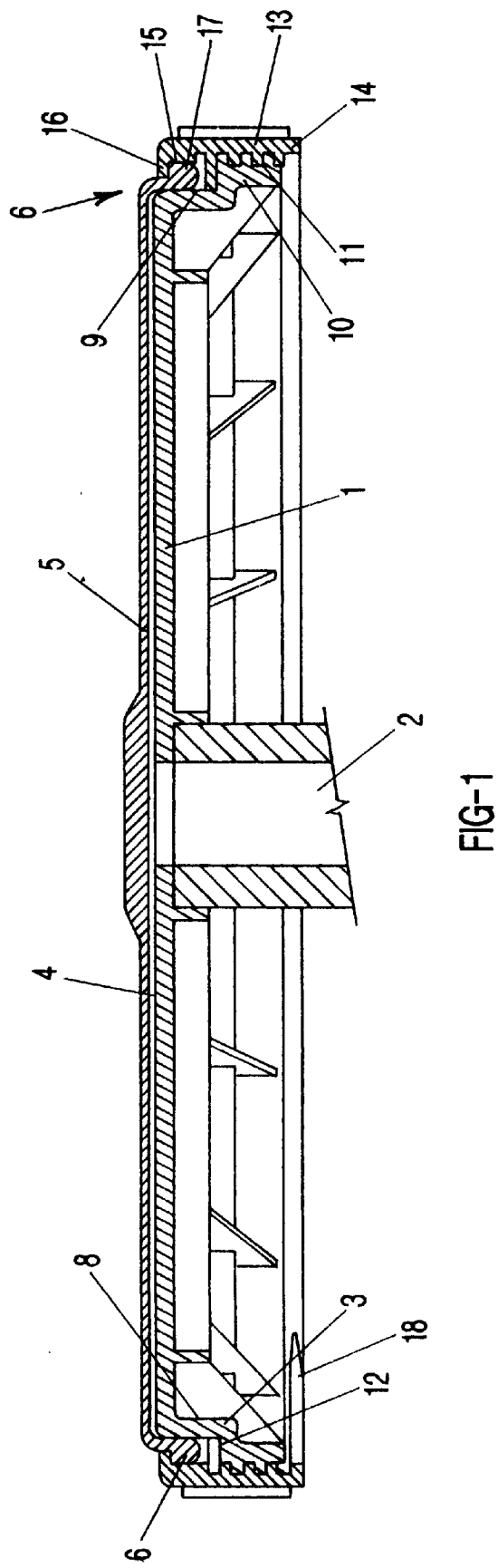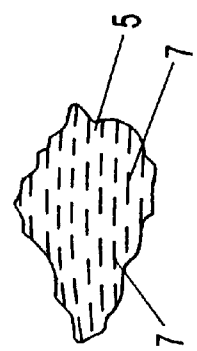

WATER AERATING DEVICE OR DIFFUSER

BACKGROUND OF THE INVENTION

The present invention relates to a water aerating device or diffuser having a plate-like, rigid, round support plate that in the operating position is disposed essentially horizontally and that has at least one opening, the water aerator also having an elastic plate of rubber or other elastomeric material that rests on the support plate and is provided with a plurality of fine slits, whereby air can be introduced via the opening or openings between the support plate and the elastic plate and expands the slits. Also provided is a fastening ring that surrounds the support plate and is axially displaceable relative thereto, with the fastening ring acting upon the rim of the elastic plate that is disposed at the outer periphery thereof.

With the heretoforeknown water aerators of this type, the fastening ring presses the outer rim of the elastic plate against the upper surface of the rim of the support plate and thereby effects a pressure deformation of the rim of the elastic plate in order in this manner to establish a water and air tight connection. Although in this manner an airtight connection is achieved, it is however not practically possible to achieve a radial deformation or stretching of the elastic plate. In addition, a so-called retightening is essentially not possible in the sealing region because the thickness of the elastic plate is relatively small.

It is an object of the present invention to eliminate the aforementioned drawbacks of water aerators of the aforementioned general type, and in so doing to achieve a retightening of the sealing region and radial stretching of the elastic plate.

BRIEF DESCRIPTION OF THE DRAWINGS

This object, and other objects and advantages of the present invention, will appear more clearly from the following specification in conjunction with the accompanying schematic drawing, in which:

FIG. 1 is a vertical cross-sectional view through one exemplary embodiment of the inventive plate-like water aerating device, and;

FIG. 2 is a partial plan view of the water aerator of FIG. 1.

SUMMARY OF THE INVENTION

To realize the aforementioned object, the water aerating device of the present invention is characterized primarily in that the rim that is disposed on the outer periphery of the elastic plate rests against the outer surface of the support plate, and a radially inwardly directed projection of the fastening ring acts upon the rim of the elastic plate in such a way that a fastening movement or displacement of the fastening ring increases the distance of the rim from the upper surface of the support plate. In this connection, the rim of the elastic plate is expediently thickened in a bead-like manner in order to bring about a good positive connection between the fastening ring and the aforementioned rim of the elastic plate. The projection of the fastening ring is preferably in the form of a circumferentially extending or annular rib on the inside of the fastening ring, whereby the cross-sectional shape of the projection could also have the shape of a hook.

With such a design of the water aerator, a radial deformation, and in particular also a retightening of the elastic plate, is readily possible; it is merely necessary for the fastening ring to be displaced downwardly in a fastening movement, in other words, a fastening movement that results in an increase of the distance of the fastening ring relative to the upper surface of the support plate. In this way, not only can permanent deformations of the elastic plate during operation be compensated for, but also differently sized plates can be used, for example plates that during manufacture contract differently. Thus, it is possible to establish deformations defined by settings or indicators on the fastening ring.

With such a deformation, at the same time adequate pressure between the rim of the elastic plate and the support plate is achieved. As a result, an air and water tight connection of the water aerator in the rim region is achieved.

Further specific features of the present invention will be described in detail subsequently.

DESCRIPTION OF PREFERRED EMBODIMENTS

Referring now to the drawing in detail, the aerator is disposed horizontally in the water and is supplied by a common line to which the aerator is connected. The connection and support of the water aerator are effected by means of a centrally disposed, vertical tubular member 2 that is disposed below a rigid, circular carrier or support plate 1.

The support plate 1, which is embodied as a molded body of plastic or other polymeric material, has a downwardly angled-off, annular, circumferentially extending rib 3 and a practically planar support surface 4 for an elastic plate 5 of rubber or rubber-like polymeric material. As will be described in greater detail subsequently, the plate 5 is securely held in position in the outer edge region 6 and has a thicker portion above the tubular member The plate 5 is provided with a plurality of fine slits 7. By introducing compressed air into the tubular member 2, and hence between the plate 5 and the surface 4, the slits 7 open and thereby introduce fine air bubbles into the water. If no air is supplied, the slits 7 are closed; water can thus not penetrate into the tubular member 2.

The edge region of the water aerator is of particular significance for the present invention.

The annular ring 3 is divided into an upper, outer portion 8 having a cylindrical outer surface 9, and a portion 10 that is provided with the thread 11 which has a greater diameter than does the outer surface 9. The resulting shoulder is indicated by the reference numeral 12.

Associated with the thread 11 is a threaded fastening ring 13, which above its threaded portion 14 is provided with a cylindrical inner surface 15 and above that with an inwardly directed, rib-like annular projection 16.

The edge region 6 of the plate 5 rests against the outer surface 9 of the upper portion 8 of the rim 3 and terminates in a bead-like thickened portion 17 that rests against the inner surface 15 of the fastening ring 13 and below the projection 16 thereof. Thus, when the fastening ring 13 is screwed on, the thickened portion 17 is contacted and, depending upon how low the fastening ring 13 is disposed, is pulled downwardly, whereby the plate 5 can be stretched radially outwardly and as a result of the loading of the thickened portion 17 and the contact against the outer surface 9, an airtight connection results that prevents compressed air from escaping laterally outwardly.

It is to be understood that the positioning of the height of the fastening ring 13 can be controlled, for example by an indicator disposed at the bottom, and in conformity therewith the elastic plate 5 can be controlled. In this connection, the height of the outer surface 9 should be sufficient to enable an adequate displacement of the threaded fastening ring 13.

The specification incorporates by reference the disclosure of German priority document 197 35 188.3 of Aug. 14, 1997.

The present invention is, of course, in no way restricted to the specific disclosure of the specification and drawing, but also encompasses any modifications within the scope of the appended claims.

We claim:

1. A water aerating device comprising:

a rigid, round, support plate that in an operating position is disposed essentially horizontally, said support plate having at least one opening allowing air to pass therethrough;

an elastic plate of elastomeric material, wherein said elastic plate rests on said support plate and is provided with a plurality of fine slits such that by means of said at least one opening of said support plate, air can be introduced between said support plate and said elastic plate for expanding said slits, said elastic plate being provided with an annular rim on an outer peripheral portion thereof, said rim resting against an outer surface of said support plate; and a fastening ring that surrounds said support plate and is axially displaceable relative thereto, said fastening ring being provided with a radially inwardly directed projection that is adapted to act upon said rim of said elastic plate such that displacement of said fastening ring in a fastening direction results in an increase of a distance of said rim from a surface of said support plate that faces said elastic plate.

2. A water aerating device according to claim 1, wherein said rim of said elastic plate is provided with a thickened bead portion.

3. A water aerating device according to claim 2, wherein said thickened bead portion of said rim extends circumferentially about said elastic plate.

4. A water aerating device according to claim 3, wherein said radially inwardly directed projection of said fastening ring has a hook-shaped cross-sectional configuration.

5. A water aerating device according to claim 2, wherein said fastening ring is provided adjacent to said projection thereof with an abutment surface for said thickened bead portion of said rim.

6. A water aerating device according to claim 5, wherein said abutment surface of said fastening ring is cylindrical.

7. A water aerating device according to claim 1, wherein remote from said outer surface thereof, said support plate has a portion that has a greater diameter than does said outer surface and that is provided with an external thread for said fastening ring.

8. A water aerating device according to claim 7, wherein said outer surface of said support plate and said external thread have at least approximately the same axial dimension.

9. A water aerating device according to claim 7, wherein said outer surface of said support plate is cylindrical and merges with said external thread via a shoulder.

10. A water aerating device according to claim 1, wherein said fastening ring is provided with an indicator for indicating a position of said fastening ring relative to said support plate.

11. A water aerating device according to claim 1, wherein said outer surface of said support plate is essentially cylindrical, extending essentially at a right angle to said surface of said support plate that faces said elastic plate, and wherein said rim of said elastic plate extends essentially at a right angle to the remainder of said elastic plate.

* * * * *